United States Patent Office 3,079,314
Patented Feb. 26, 1963

3,079,314
SONOCHEMICAL PROCESSES FOR THE PREPARATION OF ANTIMICROBIAL AGENTS
John R. E. Hoover, Glenside, Pa., assignor to Smith Kline & French Laboratories, Philadelphia, Pa., a corporation of Pennsylvania
No Drawing. Filed May 7, 1962, Ser. No. 193,001
4 Claims. (Cl. 204—154)

This application is a continuation-in-part of my copending application Serial No. 41,727, filed July 11, 1960, now abandoned.

This invention relates to novel processes for the preparation of valuable therapeutic agents. More particularly this invention pertains to the use of sonochemical techniques for preparing various synthetic derivatives of amphoteric antibiotic nuclei. For example, my invention is applicable to the preparation of both known and novel derivatives of the bicyclic nucleus of cephalosporin C, namely 7-aminocephalosporanic acid (hereafter referred to as 7-ACA), as well as related nuclei more fully described below.

7-aminocephalosporanic acid may be obtained from cephalosporin C by either acid hydrolysis or enzymatic cleavage. It is an amphoteric compound having the structure:

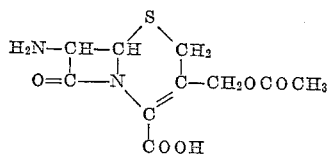

This compound can serve as a valuable intermediate for the preparation of synthetic antibiotics as for example by modification of the amino group in the 7-position. This modification may be done by acylation with an acid chloride or acid anhydride or by treatment with an isocyanate so as to form a ureido group in the 7-position. Furthermore the acid group may be modified by esterification, salt formation, or anhydride formation. The acetoxy group in the 3-position may also be modified as by hydrolysis so as to form a hydroxymethyl group which itself may be modified as by re-esterification with another acylating agent such as alkanoic acid halide or a benzoic acid halide.

While the art of preparing derivatives of and modifying 7-ACA by purely chemical means is thus still in its infancy, nevertheless it has become apparent that certain obstacles exist in this art which can be traced back to the inherent chemical nature of 7-ACA. For example, the possible reactions which may be executed upon 7-ACA are restricted to some degree by the chemically sensitive lactam structure of this compound. Similarly, while there exists a wide variety of reagents which are suitable for modifying the various groups of 7-ACA, many of these can not be employed advantageously in solvents most compatible with 7-ACA.

With particular regard to this latter difficulty, it is presumably because of 7-ACA's amphoteric properties that this compound is best employed in aqueous media. At any pH other than that of 7-ACA's isoelectric point, its solubility in non-aqueous media is so low that the feasibility of substantial reaction in such solvents is considerably diminished. As is known to the art, the solubility in organic solvents of such zwitterions can be increased by forming an appropriate salt and thereby reducing its amphoteric properties. In the case of 7-ACA, such a salt as the triethylamine salt will indeed increase its solubility in its non-aqueous solvents. However there then arises the additional necessity of preparing these derivatives and when not desired, this formation often involves as tedious a preparation as the actual formation of the desired 7-ACA derivative. Furthermore, while various salts may have increased solubilities in non-aqueous solvents as compared with the free 7-ACA, nevertheless the inherent ionic nature of the salt still restricts the compound from obtaining its optimum solubility in these non-aqueous solvents. Non-ionic derivatives such as esters of 7-ACA while overcoming this latter difficulty, nevertheless only present additional difficulties in the formation of such a group prior to and removal subsequent to, execution of the main reaction.

I have discovered that it is possible to employ 7-ACA as the free acid in non-aqueous solvents, and to effect a rapid formation of the desired derivative by subjecting the reaction mixture to vibrations of ultrasonic frequency. Under such conditions it is possible to form derivatives of 7-ACA in high yields and with a considerable diminution of reaction time. It is thus possible by virtue of my invention to react with 7-ACA reagents not suitable for aqueous media. These reactions heretofore have necessitated prior formation of a non-amphoteric 7-ACA derivative, prolonged reaction period, or both.

It appears that the advantageous effects of ultrasonic vibrations on the formation of these derivatives can be traced to at least two effects. One factor apparently involves the decrease of particle size of 6-APA aggregations upon subjection to ultrasonic vibrations. However, unlike previous methods, a stable suspension or a homogeneous solution of 7-ACA is not required to allow substantially complete reactions to be obtained. While a homogeneous solution is obtained, it is a solution of the final product and not of an intermediate 7-ACA derivative. Thus it appears that ultrasonic vibrations in the type of reactions herein described, also cause an increase in the rate of reaction.

It is thus not necessary according to my invention to form intermediates of 7-ACA solely to increase solubility in non-aqueous media. In certain instances, however, it is profitable to isolate the final product as such a derivative and to consequently employ the starting material 7-ACA in the form of this derivative. In this aspect also, application of ultrasonic vibrations result in a decrease in reaction time required for the formation of the 7-ACA intermediate. Thus, for example, in those instances where it is desirable in the main reaction to employ the triethylamine salt of 7-ACA, the complete formation of this salt is accomplished in a fraction of the time required when no ultrasonic vibrations are employed. In addition, it is often desirable to prepare such salts or other derivatives under non-aqueous conditions so that the resultant product can be directly treated with reagents incompatible with aqueous media without the necessity of drying the product prior to such treatment.

According to my invention, an amphoteric antibiotic nucleus is combined with the desired reagent reactable with said nucleus in a non-aqueous inert polar solvent and subjected to ultrasonic vibrations of the frequency herein set forth.

Exemplary of such non-aqueous inert polar solvents are those organic solvents having a dipole moment at least in the magnitude of approximately 2–3 Debye units or greater, such as for example, dimethylformamide, acetonitrile, dimethylacetamide, nitrobenzene, acetone, dichloroethane, o-nitroanisole and the like.

Representative of those reagents which are unsuitable for use in aqueous solvents and for which my process is highly advantageous, are those amine-reactive and/or alcohol-reactive agents, including acyl halides such as phenylacetyl chloride, acetyl chloride, propionyl chloride, and the like; isocyanates such as methylisocyanate, ethylisocyanate, benzylisocyanate and the like; acid anhydrides such as acetic anhydride, propionic anhydride and the like; isothiocyanates such as methylisothiocyanate, benzylisothiocyanate and the like.

Also included within the scope of the reagents are those basic reagents employed for the formation of acid derivatives, such as for example, benzyl chloride, alkali metal alkoxides, dehydrating agents for the formation of anhydrides and the like.

Generally according to my invention, the reaction mixture is subjected to ultrasonic vibrations for a period from about 30 minutes to about 4 hours, at which point substantial homogeneity is obtained and the reaction is virtually complete. While there may be a slight rise in the temperature during the reaction, it is not appreciable and it is presumably due to the cavitation effect.

By the term "ultrasonics" I refer to vibrations of a frequency generally in the range between 35,000 and 90,000 cycles per second and advantageously in the order of 35,000 to 60,000 cycles per second. Such vibrations may be obtained by any of the known methods or devices for producing ultrasonics of this frequency, as for example, by magnetostrictive or piezoelectric transducers.

It would be expected from the uses of ultrasonics heretofore reported that the complex molecular structure of these amphoteric antibiotic nuclei would be considerably altered if not drastically decomposed by the use of ultrasonic vibrations. Quite to the contrary, I have discovered that no decomposition or molecular alterations (aside from the desired transformation) occur as the result of my process. Furthermore, the reduced reaction time resulting from my process minimizes decompositions by other factors such as external heat or side reactions.

It is envisioned that my process is applicable to the formation of derivatives of related antibiotic nuclei which are modified in their chemical structure but which still retain their amphoteric nature. Thus by virtue of my process, it is possible to circumvent the solubility problems encountered when it is necessary to effect transformations on these amphoteric compounds in non-aqueous organic solvents.

The following examples will serve to further typify the method of my invention but should not be construed as limiting the scope thereof, the scope being defined only by the appended claims.

*Example 1*

Eighty milligrams of 7-aminocephalosporanic acid are added to 5 ml. of dimethylformamide and .05 ml. of phenylisocyanate. The mixture is subjected to ultrasonic vibrations at a frequency of 45,000 cycles per second for 1½ hours. At the end of this time the solution is filtered, cooled and 0.2 ml. of triethylamine are added. Ether is then added in dropwise fashion to the cooled solution until crystals appear. The solid is collected by filtration and recrystallized from a small amount of dimethylformamide to yield 7-(N-phenylureido)-cephalosporanic acid as the triethylamine salt.

*Example 2*

Eighty milligrams of 7-aminocephalosporanic acid are added to 5 ml. of acetonitrile and to the mixture is added .05 ml. of phenylisothiocyanate. The mixture is then subjected at room temperature to ultrasonic vibrations at a frequency of 60,000 cycles per second for a period of 4 hours. There is then added 0.2 ml. of triethylamine and the resultant mixture cooled. Ether is next added in dropwise fashion to the cooled solution until crystallization occurs, and the solid so formed collected by filtration and recrystallized from a small amount of dimethylformamide to yield 7-(N-phenylthioureido)-cephalosporanic acid as the triethylamine salt.

*Example 3*

There are added to 50 ml. of nitrobenzene, 5.44 g. of 7-aminocephalosporanic acid and 5.1 g. of phenoxyacetylchloride. The mixture is subjected to ultrasonic vibrations of a frequency of 50,000 cycles per second for two hours at room temperature. To the mixture is then added sufficient sodium hexanoate to effect complete precipitation and the solid thus formed collected by filtration. This solid is then dissolved in sufficient water and the aqueous solution adjusted to pH 2 by the addition of hydrochloric acid. The solid thus formed is collected, washed with a small amount of water and dried to yield 7-(phenoxycarboxyamido)-cephalosporanic acid as the sodium salt.

*Example 4*

To 50 ml. of acetonitrile is added 5.4 g. of 7-aminocephalosporanic acid and 3 g. of triethylamine. The mixture is subjected to ultrasonic vibrations at a frequency of 38,000 cycles per second for 1½ hours at room temperature. The resulting liquid is filtered to yield a homogeneous solution of 7-aminocephalosporanic acid as the triethylamine salt. In a similar fashion, dimethylformamide or other non-aqueous polar solvents may be employed in the place of acetonitrile.

This solution is then suitable for use with various reagents, wherein it is desirable to employ a non-aqueous solution. For example, to 50 ml. of a solution of 7-aminocephalosporanic acid as the triethylamine salt in acetonitrile (as herein prepared) are added 5.4 g. of 2-phenylcyclopropanecarboxyl chloride. The mixture is stirred for 3 hours. At the end of this time, the solution is cooled and ether is added until precipitation occurs. The solid is collected by filtration and recrystallized from dimethylformamide to yield 7-(2-phenylcyclopropanecarboxyamido)-cephalosporanic acid.

What is claimed is:

1. In the process for the chemical modification of at least one amphoteric group of 7-aminocephalosporanic acid under substantially non-aqueous conditions, the step which comprises subjecting a mixture of 7-aminocephalosporanic acid and the reagent for said modification in a substantially non-aqueous, inert, polar, organic solvent to ultrasonic vibrations of a frequency in the range of from about 35,000 cycles per second to about 90,000 cycles per second.

2. The process according to claim 1 wherein said non-aqueous, inert, polar, organic solvent has a dipole moment at least as great as about 2 Debye units.

3. The process according to claim 1 wherein the non-aqueous, inert, polar, organic solvent is selected from the group consisting of acetonitrile, dimethylformamide, nitrobenzene, acetone, dichloroethane and o-nitroanisole.

4. The process according to claim 1 wherein the ultrasonic vibrations are of a frequency from about 35,000 cycles per second to about 60,000 cycles per second.

References Cited in the file of this patent

UNITED STATES PATENTS

| | | |
|---|---|---|
| 2,941,995 | Doyle et al. | June 21, 1960 |
| 2,951,839 | Doyle et al. | Sept. 6, 1960 |

OTHER REFERENCES

Richards et al.: Journal American Chemical Society, volume 49 (1927), pages 3086–3100.

Campbell et al.: The Pharmaceutical Journal, August 13, 1949, pages 127–128.